(12) United States Patent
Kasada et al.

(10) Patent No.: US 10,438,628 B2
(45) Date of Patent: *Oct. 8, 2019

(54) MAGNETIC TAPE DEVICE WITH MAGNETIC TAPE HAVING PARTICULAR C-H DERIVED C CONCENTRATION AND MAGNETIC REPRODUCING METHOD

(71) Applicant: FUJIFILM Corporation, Tokyo (JP)

(72) Inventors: Norihito Kasada, Minami-ashigara (JP); Eiki Ozawa, Minami-ashigara (JP); Tetsuya Kaneko, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,383

(22) Filed: Dec. 26, 2017

(65) Prior Publication Data
US 2018/0182429 A1    Jun. 28, 2018

(30) Foreign Application Priority Data
Dec. 27, 2016    (JP) .................................. 2016-254421

(51) Int. Cl.
*G11B 5/706*    (2006.01)
*G11B 15/46*    (2006.01)
(Continued)

(52) U.S. Cl.
CPC ............ *G11B 15/46* (2013.01); *G11B 5/3909* (2013.01); *G11B 5/70* (2013.01); *G11B 5/706* (2013.01);
(Continued)

(58) Field of Classification Search
CPC .. G11B 5/70; G11B 5/706; G11B 5/71; G11B 5/73; G11B 5/84; G11B 5/842
(Continued)

(56) References Cited

U.S. PATENT DOCUMENTS

| 3,966,686 A | 6/1976 | Asakura et al. |
| 4,112,187 A | 9/1978 | Asakura et al. |

(Continued)

FOREIGN PATENT DOCUMENTS

| DE | 101 46 429 A1 | 3/2002 |
| GB | 2495356 A | 4/2013 |

(Continued)

OTHER PUBLICATIONS

Communication dated May 4, 2018 from the U.S. Patent and Trademark Office in U.S. Appl. No. 15/422,821.
(Continued)

*Primary Examiner* — Jefferson A Evans
(74) *Attorney, Agent, or Firm* — Sughrue Mion, PLLC

(57) ABSTRACT

The magnetic tape device includes: a magnetic tape; and a reproducing head, in which a magnetic tape transportation speed of the magnetic tape device is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, the magnetic layer includes one or more components selected from the group consisting of fatty acid and fatty acid amide, and a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %.

14 Claims, 2 Drawing Sheets

(51) Int. Cl.

| | |
|---|---|
| *G11B 5/39* | (2006.01) |
| *G11B 5/842* | (2006.01) |
| *G11B 5/70* | (2006.01) |
| *G11B 5/73* | (2006.01) |
| *G11B 5/78* | (2006.01) |

(52) U.S. Cl.
CPC ................. *G11B 5/73* (2013.01); *G11B 5/78* (2013.01); *G11B 5/842* (2013.01)

(58) Field of Classification Search
USPC ........................................................ 360/134
See application file for complete search history.

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A | 4/1989 | Rausch | |
| 5,242,752 A | 9/1993 | Isobe et al. | |
| 5,419,938 A | 5/1995 | Kagotani et al. | |
| 5,445,881 A | 8/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A | 7/1997 | Ejiri et al. | |
| 5,689,384 A | 11/1997 | Albrecht et al. | |
| 5,728,454 A | 3/1998 | Inaba et al. | |
| 5,786,074 A | 7/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,524,108 B2 | 9/2013 | Hattori | |
| 8,535,817 B2 | 9/2013 | Imaoka | |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 11/2016 | Biskeborn et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 | 5/2018 | Kasada | |
| 9,984,712 B1 | 5/2018 | Ozawa | |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 | 7/2018 | Kasada et al. | |
| 10,062,403 B1 | 8/2018 | Kasada et al. | |
| 10,074,393 B2 | 9/2018 | Kaneko et al. | |
| 10,134,433 B2 | 11/2018 | Kasada et al. | |
| 10,170,144 B2 | 1/2019 | Ozawa et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 | 12/2008 | Lee et al. | |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1* | 3/2010 | Biskeborn ............... B82Y 10/00 360/110 |
| 2010/0073816 A1 | 3/2010 | Komori et al. | |
| 2010/0081011 A1 | 4/2010 | Nakamura | |
| 2010/0134929 A1* | 6/2010 | Ito ....................... G11B 5/0083 360/313 |
| 2010/0227201 A1 | 9/2010 | Sasaki et al. | |
| 2010/0246073 A1 | 9/2010 | Katayama | |
| 2011/0003241 A1 | 1/2011 | Kaneko et al. | |
| 2011/0051280 A1* | 3/2011 | Karp ....................... G11B 15/02 360/73.01 |

(56) References Cited

U.S. PATENT DOCUMENTS

| | | |
|---|---|---|
| 2011/0052908 A1 | 3/2011 | Imaoka |
| 2011/0077902 A1* | 3/2011 | Awezec ............... B82Y 15/00 |
| | | 702/151 |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0139944 A1 | 3/2014 | Johnson et al. |
| 2014/0130067 A1* | 5/2014 | Madison ............ G11B 7/24073 |
| | | 720/672 |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1* | 4/2015 | Terakawa ............ G11B 5/70642 |
| | | 428/836.2 |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182430 A1 | 6/2018 | Ozawa et al. |
| 2018/0182428 A1 | 7/2018 | Kasada et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1* | 12/2018 | Kawakami ............... G11B 5/70 |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1* | 1/2019 | Endo ....................... G11B 5/78 |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |

FOREIGN PATENT DOCUMENTS

| | | |
|---|---|---|
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-57422 A | 3/1989 |
| JP | 64-60819 A | 3/1989 |
| JP | 5-258283 A | 10/1993 |

(56) References Cited

FOREIGN PATENT DOCUMENTS

| | | | |
|---|---|---|---|
| JP | 5-298653 | A | 11/1993 |
| JP | 7-57242 | A | 3/1995 |
| JP | 11-110743 | A | 4/1999 |
| JP | 11-175949 | A | 7/1999 |
| JP | 11-273051 | A | 10/1999 |
| JP | 2000-251240 | A | 9/2000 |
| JP | 2002-157726 | A | 5/2002 |
| JP | 2002-329605 | A | 11/2002 |
| JP | 2002-367142 | A | 12/2002 |
| JP | 2002-367318 | A | 12/2002 |
| JP | 2003-77116 | A | 3/2003 |
| JP | 2003-323710 | A | 11/2003 |
| JP | 2004-005820 | A | 1/2004 |
| JP | 2004-133997 | A | 4/2004 |
| JP | 2004-185676 | A | 7/2004 |
| JP | 2005-38579 | A | 2/2005 |
| JP | 2005-243063 | A | 9/2005 |
| JP | 2005-243162 | A | 9/2005 |
| JP | 2006-92672 | A | 4/2006 |
| JP | 2006-286114 | A | 10/2006 |
| JP | 2007-273039 | A | 10/2007 |
| JP | 2007-287310 | A | 11/2007 |
| JP | 2007-297427 | A | 11/2007 |
| JP | 2008-243317 | A | 10/2008 |
| JP | 2009-245515 | A | 10/2009 |
| JP | 2009-283082 | A | 12/2009 |
| JP | 2010-036350 | A | 2/2010 |
| JP | 2010-049731 | A | 3/2010 |
| JP | 2011-048878 | A | 3/2011 |
| JP | 2011-138566 | A | 7/2011 |
| JP | 2011-210288 | A | 10/2011 |
| JP | 2011-225417 | A | 11/2011 |
| JP | 2012-038367 | A | 2/2012 |
| JP | 2012-043495 | A | 3/2012 |
| JP | 2012-203955 | A | 10/2012 |
| JP | 2013-25853 | A | 2/2013 |
| JP | 2013-77360 | A | 4/2013 |
| JP | 2013-164889 | A | 8/2013 |
| JP | 2014-15453 | A | 1/2014 |
| JP | 2014-179149 | A | 9/2014 |
| JP | 2015-39801 | A | 3/2015 |
| JP | 2015-111484 | A | 6/2015 |
| JP | 2016-15183 | A | 1/2016 |
| JP | 2016-502224 | A | 1/2016 |
| JP | 2016-051493 | A | 4/2016 |
| JP | 2016-71926 | A | 5/2016 |
| JP | 2016-126817 | A | 7/2016 |
| JP | 2016-139451 | A | 8/2016 |

OTHER PUBLICATIONS

Communication dated May 4, 2018 from the U.S. Patent and Trademark Office in U.S. Appl. No. 15/625,428.
Communication dated May 4, 2018 from the U.S. Patent and Trademark Office in U.S. Appl. No. 15/422,944.
Communication dated May 7, 2018 from the U.S. Patent and Trademark Office in U.S. Appl. No. 15/624,897.
Communication dated May 7, 2018 from the U.S. Patent and Trademark Office in U.S. Appl. No. 15/624,792.
Communication dated May 7, 2018 from the U.S. Patent and Trademark Office in U.S. Appl. No. 15/626,832.
Notice of Allowance dated Aug. 30, 2017, which issued during the prosecution of U.S. Appl. No. 15/466,143.
Notice of Allowance dated Apr. 27, 2017, which issued during the prosecution of U.S. Appl. No. 15/052,115.
Notice of Allowance dated Jun. 2, 2017, which issued during the prosecution of U.S. Appl. No. 15/218,190.
Communication dated May 2, 2018 from the U.S. Patent and Trademark Office in U.S. Appl. No. 15/280,195.
Notice of Allowance dated May 8, 2017, which issued during the prosecution of U.S. Appl. No. 14/757,555.
Communication dated Dec. 6, 2016 from the U.S. Patent and Trademark Office in U.S. Appl. No. 14/757,555.
Notice of Allowance dated May 8, 2017, which issued during the prosecution of U.S. Appl. No. 14/978,834.
Communication dated Dec. 5, 2016 from the U.S. Patent and Trademark Office in U.S. Appl. No. 14/978,834.
Notice of Allowance dated Aug. 28, 2018, which issued during the prosecution of U.S. Appl. No. 14/522,821.
Notice of Allowance dated Sep. 4, 2018, which issued during the prosecution of U.S. Appl. No. 15/625,428.
Communication dated Aug. 3, 2018 from the U.S. Patent and Trademark Office in U.S. Appl. No. 15/380,336.
Communication dated Aug. 23, 2018 from the U.S. Patent and Trademark Office in U.S. Appl. No. 15/614,876.
Communication dated Aug. 24, 2018 from the U.S. Patent and Trademark Office in U.S. Appl. No. 15/620,916.
Communication dated Aug. 23, 2018 from the U.S. Patent and Trademark Office in U.S. Appl. No. 15/621,464.
Communication dated Aug. 23, 2018 from the U.S. Patent and Trademark Office in U.S. Appl. No. 15/626,720.
Notice of Allowance dated Aug. 28, 2018, which issued during the prosecution of U.S. Appl. No. 15/422,821.
U.S. Appl. No. 15/422,821, Pending.
U.S. Appl. No. 15/624,897, Allowed; RCE filed Nov. 21, 2018.
U.S. Appl. No. 15/624,792, Allowed; RCE filed Nov. 21, 2018.
U.S. Appl. No. 15/626,832, Allowed; RCE filed Nov. 21, 2018.
U.S. Appl. No. 15/625,428, Allowed Dec. 4, 2018; RCE Filed.
U.S. Appl. No. 15/380,336, Allowed; RCE filed Nov. 21, 2018.
U.S. Appl. No. 15/628,814, Pending.
U.S. Appl. No. 15/626,355, Pending.
U.S. Appl. No. 15/380,309, Pending.
U.S. Appl. No. 15/241,286, Patented as U.S. Pat. No. 10,026,433.
U.S. Appl. No. 15/900,164, Pending.
U.S. Appl. No. 15/920,518, Allowed.
U.S. Appl. No. 15/899,430, Pending.
U.S. Appl. No. 15/920,515, Pending.
U.S. Appl. No. 15/920,517, Pending.
U.S. Appl. No. 15/920,538, Pending.
U.S. Appl. No. 15/920,544, Pending.
U.S. Appl. No. 15/920,768, Allowed; RCE filed.
U.S. Appl. No. 16/009,603, Quayle Action issued (RCE filed).
U.S. Appl. No. 16/182,083, Pending (Not yet published; continuation of U.S. Appl. No. 15/920,768).
U.S. Appl. No. 16/100,289, Pending.
U.S. Appl. No. 15/900,106, Pending.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Office Action dated Dec. 20, 2018 in U.S. Appl. No. 15/900,106.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Nov. 14, 2018 in U.S. Appl. No. 16/100,289.
Notice of Allowance, dated Dec. 2, 2016, issued by the U.S. Patent and Trademark Office in U.S. Appl. No. 14/753,227.
Office Action dated Nov. 18, 2016 from U.S. Patent & Trademark Office in U.S. Appl. No. 14/753,227.
Office Action dated Aug. 15, 2016 from U.S. Patent & Trademark Office in U.S. Appl. No. 14/753,227.
Office Action dated Feb. 4, 2016 from U.S. Patent & Trademark Office in U.S. Appl. No. 14/753,227.
Notice of Allowance, dated Jul. 12, 2017, issued by the U.S. Patent and Trademark Office in U.S. Appl. No. 15/388,864.
Office Action dated Jun. 9, 2017 from U.S. Patent & Trademark Office in U.S. Appl. No. 15/388,864.
Office Action dated Apr. 26, 2017 from U.S. Patent & Trademark Office in U.S. Appl. No. 15/388,864.
Office Action dated Jun. 7, 2018 from U.S. Patent & Trademark Office in U.S. Appl. No. 15/380,309.
Office Action dated Aug. 3, 2018 from U.S. Patent & Trademark Office in U.S. Appl. No. 15/388,911.
Office Action dated May 30, 2018 from U.S. Patent & Trademark Office in U.S. Appl. No. 15/388,911.

(56) References Cited

OTHER PUBLICATIONS

Office Action dated Nov. 16, 2016 which issued during the prosecution of U.S. Appl. No. 15/072,550.
Notice of Allowance dated Apr. 25, 2017 which issued during the prosecution of U.S. Appl. No. 15/072,550.
Notice of Allowance dated May 10, 2018 which issued during the prosecution of U.S. Appl. No. 15/615,871.
Notice of Allowance dated Mar. 16, 2018 which issued during the prosecution of U.S. Appl. No. 15/854,410.
Office Action dated Jul. 6, 2018, which issued during the prosecution of U.S. Appl. No. 15/848,173.
Office Action dated Oct. 3, 2018, which issued during the prosecution of U.S. Appl. No. 15/280,195.
Office Action dated Oct. 15, 2018, which issued during the prosecution of U.S. Appl. No. 15/619,012.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,897.
Notice of Allowance dated Oct. 11, 2018, which issued during the prosecution of U.S. Appl. No. 15/624,792.
Notice of Allowance dated Oct. 12, 2018, which issued during the prosecution of U.S. Appl. No. 15/626,832.
Notice of Allowance dated Oct. 11, 2018, which issued during the prosecution of U.S. Appl. No. 15/380,336.
Office Action dated Oct. 9, 2018, which issued during the prosecution of U.S. Appl. No. 15/628,814.
Office Action dated Oct. 22, 2018, which issued during the prosecution of U.S. Appl. No. 15/854,439.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Aug. 10, 2017, which issued during the prosecution of U.S. Appl. No. 14/870,618.
Notice of Allowance dated Feb. 14, 2018, which issued during the prosecution of U.S. Appl. No. 14/870,618.
Office Action dated Sep. 26, 2017 issued by the Japanese Patent Office in JP Appln. No. 2014-265723 corresponding to U.S. Appl. No. 14/870,618.
Office Action dated Sep. 26, 2017 issued by the Japanese Patent Office in JP Appln. No. 2015-249264 corresponding to U.S. Appl. No. 14/870,618.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Jul. 3, 2018, which issued during the prosecution of U.S. Appl. No. 15/920,518.
Office Action dated Nov. 28, 2018, which issued during the prosecution of U.S. Appl. No. 15/899,587.
Office Action dated Oct. 5, 2017, which issued during the prosecution of U.S. Appl. No. 15/241,286.
Notice of Allowance dated Mar. 21, 2018, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Notice of Allowance dated Mar. 19, 2018, which issued during the prosecution of U.S. Appl. No. 15/378,907.
Notice of Allowance dated Mar. 27, 2018, which issued during the prosecution of U.S. Appl. No. 15/241,631.
Office Action dated Jan. 27, 2015 from the Japanese Patent Office in Japanese Application No. 2013-053543.
Notice of Allowance dated Mar. 14, 2018, which issued during the prosecution of U.S. Appl. No. 15/854,474.
Office Action dated Sep. 19, 2014, which issued during the prosecution of U.S. Appl. No. 14/209,065.
Office Action dated Mar. 13, 2015, which issued during the prosecution of U.S. Appl. No. 14/209,065.
Office Action dated Jul. 6, 2015, which issued during the prosecution of U.S. Appl. No. 14/209,065.
Office Action dated Sep. 10, 2015, which issued during the prosecution of U.S. Appl. No. 14/209,065.
Office Action dated Mar. 24, 2016, which issued during the prosecution of U.S. Appl. No. 14/209,065.
Notice of Allowance dated Oct. 6, 2016, which issued during the prosecution of U.S. Appl. No. 14/209,065.
Notice of Allowance dated Mar. 21, 2018, which issued during the prosecution of U.S. Appl. No. 15/241,297.
Notice of Allowance dated Jun. 28, 2017, which issued during the prosecution of U.S. Appl. No. 15/464,991.
Office Action dated Nov. 8, 2016 from the Japanese Patent Office in Japanese Application No. 2014-199022.
Office Action dated Feb. 25, 2016, which issued during the prosecution of U.S. Appl. No. 14/867,752.
Office Action dated Oct. 19, 2016, which issued during the prosecution of U.S. Appl. No. 14/867,752.
Office Action dated Mar. 16, 2017, which issued during the prosecution of U.S. Appl. No. 14/867,752.
Office Action dated Sep. 7, 2017, which issued during the prosecution of U.S. Appl. No. 14/867,752.
Office Action dated Jan. 31, 2018, which issued during the prosecution of U.S. Appl. No. 14/867,752.
Notice of Allowance dated Apr. 5, 2018, which issued during the prosecution of U.S. Appl. No. 14/867,752.
Office Action dated Apr. 19, 2018, which issued during the prosecution of U.S. Appl. No. 15/854,438.
Notice of Allowance dated Sep. 24, 2018, which issued during the prosecution of U.S. Appl. No. 15/854,438.
Notice of Allowance dated Jul. 13, 2018, which issued during the prosecution of U.S. Appl. No. 15/920,782.
Notice of Allowance dated Aug. 9, 2018, which issued during the prosecution of U.S. Appl. No. 15/920,563.
Office Action dated Nov. 28, 2018, which issued during the prosecution of U.S. Appl. No. 15/900,144.
Office Action dated Nov. 28, 2018, which issued during the prosecution of U.S. Appl. No. 15/900,080.
Office Action dated Sep. 28, 2018, which issued during the prosecution of U.S. Appl. No. 15/854,409.
Office Action dated Oct. 15, 2018, which issued during the prosecution of U.S. Appl. No. 15/854,403.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 31, 2018 in U.S. Appl. No. 16/009,603.

(56) References Cited

OTHER PUBLICATIONS

An Office Action dated Nov. 29, 2018, which issued during the prosecution of U.S. Appl. No. 15/380,309.
An Office Action dated Nov. 29, 2018, which issued during the prosecution of U.S. Appl. No. 15/422,821.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Pending.
U.S. Appl. No. 15/422,821, Allowed.
U.S. Appl. No. 15/422,944, Allowed.
U.S. Appl. No. 15/466,143, Patented as U.S. Pat. No. 9,837,116.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/625,428, Allowed.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Pending.
U.S. Appl. No. 15/614,876, Pending.
U.S. Appl. No. 15/620,916, Pending.
U.S. Appl. No. 15/621,464, Pending.
U.S. Appl. No. 15/626,720, Allowed.
U.S. Appl. No. 15/854,507, Patented as U.S. Pat. No. 9,984,716.
U.S. Appl. No. 15/854,439, Pending.
U.S. Appl. No. 15/854,506, Patented as U.S. Pat. No. 10,008,230.
U.S. Appl. No. 15/848,173, Allowed.
U.S. Appl. No. 15/628,814, Allowed.
U.S. Appl. No. 15/690,400, Pending.
U.S. Appl. No. 15/690,906, Pending.
U.S. Appl. No. 15/626,355, Allowed.
U.S. Appl. No. 15/627,696, Pending.
U.S. Appl. No. 14/870,618, Patented as U.S. Pat. No. 9,959,894.
U.S. Appl. No. 15/388,911, Pending.
U.S. Appl. No. 14/753,227, Patented as U.S. Pat. No. 9,601,146.
U.S. Appl. No. 15/380,309, Allowed.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.
U.S. Appl. No. 15/241,286, Patented as U.S. Pat. No. 10,026,4331.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Allowed.
U.S. Appl. No. 15/854,409, Allowed.
U.S. Appl. No. 15/443,026, Pending.
U.S. Appl. No. 15/920,782, Patented as U.S. Pat. No. 10,134,433.
U.S. Appl. No. 15/920,563, Allowed.
U.S. Appl. No. 15/920,533, Pending.
U.S. Appl. No. 15/900,144, Pending.
U.S. Appl. No. 15/900,080, Pending.
U.S. Appl. No. 15/900,230, Pending.
U.S. Appl. No. 15/900,164, Allowed.
U.S. Appl. No. 15/920,518, Pending.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 15/705,531, Pending.
U.S. Appl. No. 16/232,165, Pending (Continuation of U.S. Appl. No. 15/854,438).
U.S. Appl. No. 16/100,289, Allowed.
U.S. Appl. No. 16/038,669, Pending.
U.S. Appl. No. 15/900,106, Allowed.
U.S. Appl. No. 15/900,412, Patented as U.S. Pat. No. 10,062,4032.
U.S. Appl. No. 15/900,141, Pending.
U.S. Appl. No. 15/900,160, Pending.
U.S. Appl. No. 15/900,345, Pending.
U.S. Appl. No. 15/900,379, Allowed.
U.S. Appl. No. 16/012,018, Pending.
U.S. Appl. No. 15/920,616, Pending.
U.S. Appl. No. 15/900,242, Allowed.
U.S. Appl. No. 15/900,334, Pending.
U.S. Appl. No. 15/920,592, Pending.
U.S. Appl. No. 15/920,635, Patented as U.S. Pat. No. 10,170,144.
U.S. Appl. No. 16/160,377, Pending.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Allowed.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Allowed.
U.S. Appl. No. 16/142,560, Pending.
U.S. Appl. No. 16/184,312, Pending.
U.S. Appl. No. 16/143,646, Pending.
"Introduction to TMR Magnetic Sensors", Anonymous, Mar. 12, 2015, MR Sensor Technology, pp. 1-5 (Year: 2015).
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated Mar. 5, 2019 in U.S. Appl. No. 16/009,603.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 27, 2018 in U.S. Appl. No. 15/900,334.
Office Action dated Dec. 7, 2018 in U.S. Appl. No. 15/920,592.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 28, 2019 in U.S. Appl. No. 15/920,518.

(56) References Cited

OTHER PUBLICATIONS

Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 5, 2019 in U.S. Appl. No. 15/443,026.
Office Action dated Mar. 6, 2019 in U.S. Appl. No. 15/854,403.
Office Action dated Mar. 7, 2019 in U.S. Appl. No. 15/854,439.
Office Action dated Nov. 19, 2018 in U.S. Appl. No. 15/900,141.
Notice of Allowance dated May 13, 2019 in U.S. Appl. No. 15/900,379.
Notice of Allowance dated May 14, 2019 in U.S. Appl. No. 15/900,164.
Notice of Allowance dated May 14, 2019 in U.S. Appl. No. 15/422,821.
Office Action dated Apr. 4, 2019 in U.S. Appl. No. 16/184,312.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated May 23, 2019 in U.S. Appl. No. 15/388,911.
Office Action dated Aug. 6, 2019 in Japanese Application No. 2016-254421.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Office Action dated Aug. 6, 2019 in Japanese Application No. 2016-254427.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.

\* cited by examiner

MAGNETIC TAPE DEVICE WITH MAGNETIC TAPE HAVING PARTICULAR C-H DERIVED C CONCENTRATION AND MAGNETIC REPRODUCING METHOD

CROSS-REFERENCE TO RELATED APPLICATIONS

This application claims priority under 35 U.S.C 119 to Japanese Patent Application No. 2016-254421 filed on Dec. 27, 2016. The above application is hereby expressly incorporated by reference, in its entirety, into the present application.

BACKGROUND OF THE INVENTION

1. Field of the Invention

The present invention relates to a magnetic tape device and a magnetic reproducing method.

2. Description of the Related Art

Magnetic recording is used as a method of recording information in a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head in the magnetic disk device. On the other hand, the usage of the TMR head in the magnetic tape device is still currently in a stage where the further use thereof is expected. The reason why the usage thereof is not yet practically realized is because it is not necessary that a reproducing head used in the magnetic tape device have sensitivity improved enough for using the TMR head. Nevertheless, in a case where the TMR head can be used as the reproducing head even in the magnetic tape device, it is possible to deal with higher-density recording of a magnetic tape in the future.

Therefore, an object of one aspect of the invention is to provide a magnetic tape device in which a TMR head is mounted as a reproducing head.

A magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. It is said that a resistance value of the TMR head is generally high, as disclosed in a paragraph 0007 of JP2004-185676A, but generation of a significant decrease in resistance value in the TMR head may cause a decrease in reproduction output and a deterioration of electromagnetic conversion characteristics (specifically, signal-to-noise-ratio (SNR)) accompanied with that.

During intensive studies for achieving the object described above, the inventors have found a phenomenon which was not known in the related art, in that, in a case of using the TMR head as a reproducing head in the magnetic tape device, a significant decrease in resistance value (electric resistance) occurs in the TMR head. A decrease in resistance value of the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of reproducing information by using the TMR head as a reproducing head was not even confirmed in the related art. A difference in the recording and reproducing system between the magnetic disk device and the magnetic tape device, specifically, contact and non-contact between a magnetic recording medium and a magnetic head at the time of the reproducing may be the reason why a significant decrease in resistance value of the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads.

With respect to this, as a result of more intensive studies after finding the phenomenon described above, the inventors have newly found the following points.

It is desired that a transportation speed of a magnetic tape of a magnetic tape device is decreased, in order to prevent a deterioration in recording and reproducing characteristics. But, in a case where the transportation speed of the magnetic tape of the magnetic tape device is set to be equal to or smaller than a predetermined value (specifically, equal to or lower than 18 m/sec), a decrease in resistance value of the TMR head occurs particularly significantly.

However, such a decrease in resistance value can be prevented by using a magnetic tape described below as the magnetic tape.

One aspect of the invention has been completed based on the finding described above.

That is, according to one aspect of the invention, there is provided a magnetic tape device comprising: a magnetic tape; and a reproducing head, in which a magnetic tape transportation speed of the magnetic tape device is equal to or lower than 18 m/sec, the reproducing head is a magnetic head (hereinafter, also referred to as a "TMR head") including a tunnel magnetoresistance effect type element (hereinafter, also referred to as a "TMR element") as a reproducing element, the magnetic tape includes a non-magnetic support, and a magnetic layer including ferromagnetic powder and a binding agent on the non-magnetic support, the magnetic layer includes one or more components selected from the group consisting of fatty acid and fatty acid amide, and a C—H derived C concentration calculated from a C—H peak area ratio of C1s spectra obtained by X-ray photoelectron spectroscopic analysis performed on the surface of the magnetic layer at a photoelectron take-off angle of 10 degrees (hereinafter, also simply referred to as a "C—H derived C concentration") is 45 to 65 atom %.

According to another aspect of the invention, there is provided a magnetic reproducing method comprising: reproducing information recorded on a magnetic tape by a reproducing head, in which a magnetic tape transportation speed during the reproducing is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, the magnetic layer includes one or more components selected from the group consisting of fatty acid and fatty acid amide, and a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %.

One aspect of the magnetic tape device and the magnetic reproducing method is as follows.

In one aspect, the C—H derived C concentration is 50 to 65 atom %.

In one aspect, a center line average surface roughness Ra measured regarding a surface of the magnetic layer is equal to or smaller than 2.8 nm.

In one aspect, the center line average surface roughness Ra is equal to or smaller than 2.5 nm.

In one aspect, the magnetic tape includes a non-magnetic layer including non-magnetic powder and a binding agent between the non-magnetic support and the magnetic layer, and a total thickness of the magnetic layer and the non-magnetic layer is equal to or smaller than 1.8 µm.

In one aspect, the total thickness of the magnetic layer and the non-magnetic layer is equal to or smaller than 1.1 µm.

According to the one aspect of the invention, it is possible to prevent occurrence of a significant decrease in resistance value in the TMR head, in a case of reproducing information recorded on the magnetic tape at a magnetic tape transportation speed equal to or lower than 18 m/sec.

DESCRIPTION OF THE PREFERRED EMBODIMENTS

Magnetic Tape Device

Figure 1:
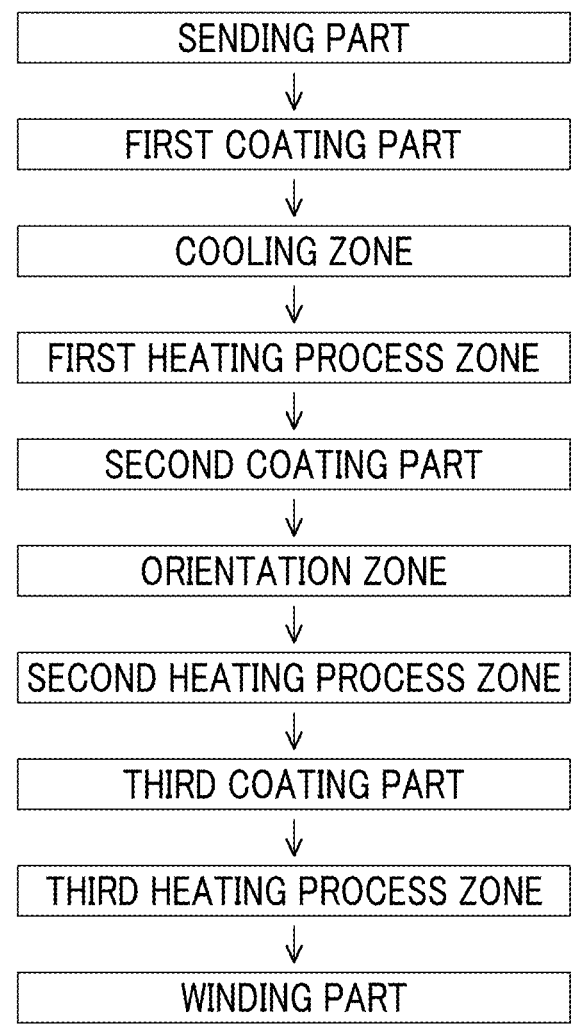
FIG. 1 shows an example (step schematic view) of a specific aspect of a magnetic tape manufacturing step.
Figure 2:
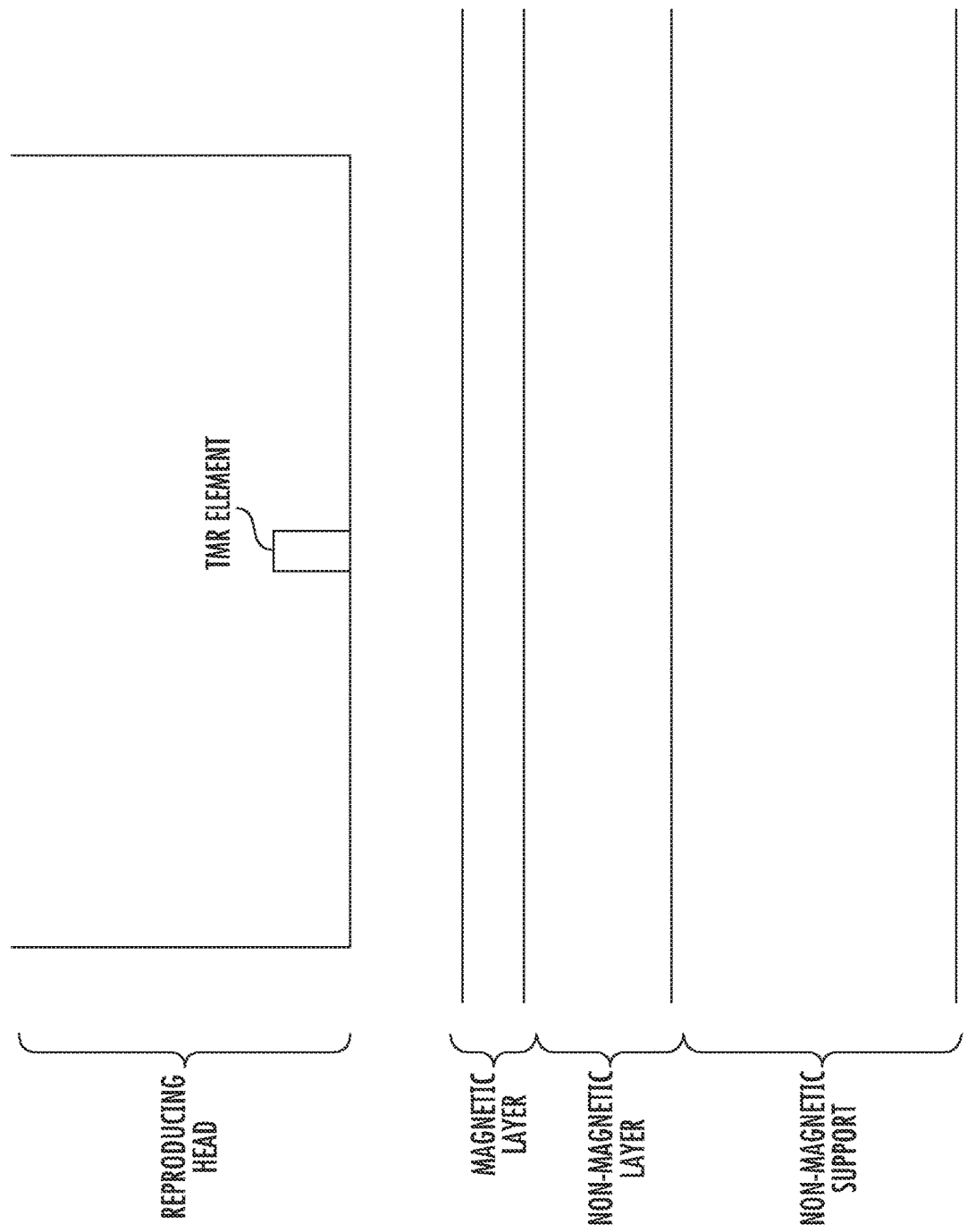
FIG. 2 is a schematic illustration of an embodiment of a magnetic tape device of the invention, which shows the reproducing head, the tunnel magnetoresistance effect type element, and a non-magnetic layer between the non-magnetic support and the magnetic layer, the magnetic layer including a fatty acid and/or a fatty acid amide and having a C—H derived C concentration of from 45 to 65 atom %.

One aspect of the invention relates to a magnetic tape device including: a magnetic tape; and a reproducing head, in which a magnetic tape transportation speed of the magnetic tape device is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, the magnetic layer includes one or more components selected from the group consisting of fatty acid and fatty acid amide, and a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %.

In the magnetic tape device, in a case of using a magnetic tape of the related art, in a case of performing reproducing by using a TMR head as a reproducing head under specific conditions in which the magnetic tape transportation speed is equal to or lower than 18 m/sec, a phenomenon in which a resistance value (electric resistance) significantly decreases in the TMR head occurs. This phenomenon is a phenomenon that has been newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, information recorded on the magnetic tape can be reproduced.

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reproducing information recorded on the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reproducing information recorded on the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurring even at one portion between the two electrodes as described above is a phenomenon which does not occur in other MR heads. In the magnetic disk device using a levitation type recording and reproducing system, a magnetic disk and a reproducing head do not come into contact with each other at the time of reproducing, and thus, damage causing short circuit hardly occurs. On the other hand, in the magnetic tape device using a sliding type recording and reproducing system, in a case where any measures are not prepared, the TMR head is damaged due to the sliding between the TMR head and the magnetic tape, and thus, short circuit easily occurs. Among these, in a case where the transportation speed of the magnetic tape is low, the time for which the same portion of the TMR head comes into contact with the magnetic tape increases at the time of reproducing, and accordingly, damage more easily occurs. The inventors have assumed that this is the reason why a decrease in resistance value of the TMR head occurs particularly significantly at the time of reproducing in the magnetic tape device in which the magnetic tape transportation speed is equal to or lower than 18 m/sec.

With respect to this, as a result of intensive studies of the inventors, the inventors have newly found that it is possible to prevent a phenomenon in which a decrease in resistance value of the TMR head occurs particularly significantly at the time of reproducing in the magnetic tape device in which the magnetic tape transportation speed is equal to or lower than 18 m/sec, by using the magnetic tape which includes the magnetic layer including ferromagnetic powder and a binding agent on the non-magnetic support, and in which the magnetic layer includes one or more components selected from the group consisting of fatty acid and fatty acid amide, and the C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %. This point will be further described below.

The "X-ray photoelectron spectroscopic analysis" is an analysis method also generally called Electron Spectroscopy for Chemical Analysis (ESCA) or X-ray Photoelectron Spectroscopy (XPS). Hereinafter, the X-ray photoelectron spectroscopic analysis is also referred to as ESCA. The ESCA is an analysis method using a phenomenon of photoelectron emission in a case where a surface of a measurement target sample is irradiated with X ray, and is widely used as an analysis method regarding a surface part of a measurement target sample. According to the ESCA, it is possible to perform qualitative analysis and quantitative analysis by using X-ray photoemission spectra acquired by the analysis regarding the sample surface of the measurement target. A depth from the sample surface to the analysis position (hereinafter, also referred to as a "detection depth") and photoelectron take-off angle generally satisfy the following expression: detection depth mean free path of electrons×3×sin θ. In the expression, the detection depth is a depth where 95% of photoelectrons configuring X-ray photoemission spectra are generated, and θ is the photoelectron take-off angle. From the expression described above, it is found that, as the photoelectron take-off angle decreases, the analysis regarding a shallow part of the depth from the sample surface can be performed, and as the photoelectron take-off angle increases, the analysis regarding a deep part of the depth from the sample surface can be performed. In the analysis performed by the ESCA at a photoelectron take-off angle of 10 degrees, an extreme outermost surface part having a depth of approximately several nm from the sample surface generally becomes an analysis position. Accordingly, in the surface of the magnetic layer of the magnetic tape, according to the analysis performed by the ESCA at a photoelectron take-off angle of 10 degrees, it is possible to perform composition analysis regarding the extreme outermost surface part having a depth of approximately several nm from the surface of the magnetic layer.

The C—H derived C concentration is a percentage of carbon atoms C configuring the C—H bond occupying total (based on atom) 100 atom % of all elements detected by the qualitative analysis performed by the ESCA. The magnetic tape includes one or more components selected from the group consisting of fatty acid and fatty acid amide at least in the magnetic layer. Fatty acid and fatty acid amide are components which can function as lubricants in the magnetic tape. The inventors have considered that, in the surface of the magnetic layer of the magnetic tape including one or more of these components at least in the magnetic layer, the C—H derived C concentration obtained by the analysis performed by the ESCA at a photoelectron take-off angle of 10 degrees becomes an index for the presence amount of the components (one or more components selected from the group consisting of fatty acid and fatty acid amide) in the extreme outermost surface part of the magnetic layer. Specific description is as follows.

In X-ray photoemission spectra (horizontal axis: bonding energy, vertical axis: strength) obtained by the analysis performed by the ESCA, the C1s spectra include information regarding an energy peak of a 1 s orbit of the carbon atoms C. In such C1s spectra, a peak positioned in the vicinity of the bonding energy 284.6 eV is a C—H peak. This C—H peak is a peak derived from the bonding energy of the C—H bond of the organic compound. The inventors have surmised that, in the extreme outermost surface part of the magnetic layer including one or more components selected from the group consisting of fatty acid and fatty acid amide, main constituent components of the C—H peak are components selected from the group consisting of fatty acid and fatty acid amide. Accordingly, the inventors have considered that the C—H derived C concentration can be used as an index for the presence amount as described above.

The inventors have surmised that, a state where the C—H derived C concentration is equal to or greater than 45 atom %, that is, a state where a large amount of one or more components selected from the group consisting of fatty acid and fatty acid amide is present in the extreme outermost surface part of the magnetic layer contributes to smooth sliding between the magnetic tape and the TMR head, thereby preventing occurrence of short circuit due to damage on the TMR head due to the sliding on the magnetic tape. In a case where the magnetic tape and the TMR head extremely smoothly slide on each other, slipping occurs and damage on the TMR head may occur. With respect to this, the inventors have surmised that, in a case where the C—H derived C concentration is equal to or smaller than 65 atom %, it is possible to prevent occurrence of slipping, and thus, it is possible to prevent occurrence of short circuit due to damage on the TMR head.

However, the above descriptions are merely a surmise of the inventors and the invention is not limited thereto.

Regarding the C—H derived C concentration, JP2016-126817A discloses that the C—H derived C concentration is set to be in a specific range, in order to prevent a decrease in electromagnetic conversion characteristics of a thinned magnetic tape during repeated running under both humidity environments of a low humidity environment and a high humidity environment. However, as described above, the usage of the TMR head as a reproducing head in the magnetic tape device is still currently in a stage where the further use thereof is expected. In addition, in the magnetic tape device in which the TMR head is mounted as a reproducing head, the generation of a particularly significant decrease in resistance value of the TMR head at a specific magnetic tape transportation speed (specifically, equal to or lower than 18 m/sec) is a phenomenon which was not known in the related art. With respect to such a phenomenon, the effect of the C—H derived C concentration and a possibility of prevention of the phenomenon by setting the C—H derived C concentration to be 45 to 65 atom % is not disclosed in JP2016-126817A and is newly found by the inventors as a result of intensive studies.

Hereinafter, the magnetic tape device will be described more specifically. A "decrease in resistance value of the TMR head" described below is a significant decrease in resistance value of the TMR head occurring in a case of reproducing information recorded on the magnetic tape by the TMR head, in the magnetic tape device having the magnetic tape transportation speed equal to or lower than 18 m/sec, otherwise not noted.

Magnetic Tape

C—H Derived C Concentration

The C—H derived C concentration of the magnetic tape is equal to or greater than 45 atom %, from a viewpoint of preventing a decrease in resistance value of the TMR head. The C—H derived C concentration is preferably equal to or greater than 48 atom % and more preferably equal to or greater than 50 atom %, from a viewpoint of further preventing a decrease in resistance value of the TMR head. The C—H derived C concentration of the magnetic tape is equal to or smaller than 65 atom %, from a viewpoint of preventing a decrease in resistance value of the TMR head. The C—H derived C concentration can also be, for example, equal to or smaller than 63 atom % or equal to or smaller than 60 atom %.

As described above, the C—H derived C concentration is a value obtained by analysis using ESCA. A region for the analysis is a region having an area of 300 μm×700 μm at an arbitrary position of the surface of the magnetic layer of the magnetic tape. In the invention and the specification, the "surface of the magnetic layer" of the magnetic tape is identical to the surface of the magnetic tape on the magnetic layer side. The qualitative analysis is performed by wide scan measurement (pass energy: 160 eV, scan range: 0 to 1,200 eV, energy resolution: 1 eV/step) performed by ESCA. Then, spectra of entirety of elements detected by the qualitative analysis are obtained by narrow scan measurement (pass energy: 80 eV, energy resolution: 0.1 eV, scan range: set for each element so that the entirety of spectra to be measured is included). An atomic concentration (unit: atom %) of each element is calculated from the peak surface area of each spectrum obtained as described above. Here, an atomic concentration (C concentration) of carbon atoms is also calculated from the peak surface area of C1s spectra.

In addition, C1s spectra are obtained (pass energy: 10 eV, scan range: 276 to 296 eV, energy resolution: 0.1 eV/step). The obtained C1s spectra are subjected to a fitting process by a nonlinear least-squares method using a Gauss-Lorentz complex function (Gaussian component: 70%, Lorentz component: 30%), peak resolution of a peak of a C—H bond of the C1s spectra is performed, and a percentage (peak area ratio) of the separated C—H peak occupying the C1s spectra is calculated. A C—H derived C concentration is calculated by multiplying the calculated C—H peak area ratio by the C concentration.

An arithmetical mean of values obtained by performing the above-mentioned process at different positions of the surface of the magnetic layer of the magnetic tape three times is set as the C—H derived C concentration. In addition, the specific aspect of the process described above is shown in examples which will be described later.

As preferred means for adjusting the C—H derived C concentration described above a cooling step can be performed in a non-magnetic layer forming step which will be described later specifically. However, the magnetic tape is not limited to a magnetic tape manufactured through such a cooling step.

Fatty Acid and Fatty Acid Amide

The magnetic tape includes one or more components selected from the group consisting of fatty acid and fatty acid amide at least in the magnetic layer. The magnetic layer may include only one or both of fatty acid and fatty acid amide. The inventors have considered that the presence of a large amount of the components in the extreme outermost surface part of the magnetic layer so that the C—H derived C concentration becomes 45 to 65 atom % contributes to prevention of a decrease in resistance value of the TMR head. In addition, in the magnetic tape including a non-magnetic layer which will be described later specifically between the non-magnetic support and the magnetic layer, one or more components selected from the group consisting of fatty acid and fatty acid amide may be included in the non-magnetic layer. The non-magnetic layer can play a role of holding a lubricant such as fatty acid or fatty acid amide and supply the lubricant to the magnetic layer. The lubricant such as fatty acid or fatty acid amide included in the non-magnetic layer may be moved to the magnetic layer and present in the magnetic layer.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and specific examples thereof include lauric acid amide, myristic acid amide, palmitic acid amide, and stearic acid amide.

Regarding fatty acid and a derivative of fatty acid (amide and ester which will be described later), a part derived from fatty acid of the fatty acid derivative preferably has a structure which is the same as or similar to that of fatty acid used in combination. As an example, in a case of using fatty acid and stearic acid, it is preferable to use stearic acid amide and/or stearic acid ester.

The content of fatty acid of a magnetic layer forming composition is, for example, 0.1 to 10.0 parts by mass and is preferably 1.0 to 7.0 parts by mass, with respect to 100.0 parts by mass of ferromagnetic powder. In a case of adding two or more kinds of different fatty acids to the magnetic layer forming composition, the content thereof is the total content of two or more kinds of different fatty acids. The same applies to other components. In addition, in the invention and the specification, a given component may be used alone or used in combination of two or more kinds thereof, unless otherwise noted.

The content of fatty acid amide in the magnetic layer forming composition is, for example, 0.1 to 3.0 parts by mass and is preferably 0.1 to 1.0 part by mass with respect to 100.0 parts by mass of ferromagnetic powder.

Meanwhile, the content of fatty acid in a non-magnetic layer forming composition is, for example, 1.0 to 10.0 parts by mass and is preferably 1.0 to 7.0 parts by mass with respect to 100.0 parts by mass of non-magnetic powder. In addition, the content of fatty acid amide in the non-magnetic layer forming composition is, for example, 0.1 to 3.0 parts by mass and is preferably 0.1 to 1.0 part by mass with respect to 100.0 parts by mass of non-magnetic powder.

Next, the magnetic layer and the like included in the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351 can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss.

In the invention and the specification, the average particle size of the ferromagnetic powder and other powder is an average particle size obtained by the method described above, unless otherwise noted. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more components selected from the group consisting of fatty acid and fatty acid amide, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)
Column: TSK gel Multipore HXL-M (manufactured by Tosoh Corporation, 7.8 mmID (inner diameter)×30.0 cm)
Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a lubricant, a dispersing agent, a dispersing assistant, an antifungal agent, an antistatic agent, an antioxidant, and carbon black. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$. Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the center line average surface roughness Ra measured regarding the surface of the magnetic layer.

Fatty Acid Ester

One or both of the magnetic layer and the non-magnetic layer which will be described later specifically may include or may not include fatty acid ester.

All of Fatty acid ester, fatty acid, and fatty acid amide are components which can function as a lubricant. The lubricant is generally broadly divided into a fluid lubricant and a boundary lubricant. Fatty acid ester is called a component which can function as a fluid lubricant, whereas fatty acid and fatty acid amide is called as a component which can function as a boundary lubricant. It is considered that the boundary lubricant is a lubricant which can be attached to a surface of powder (for example, ferromagnetic powder) and form a rigid lubricant film to decrease contact friction. Meanwhile, it is considered that the fluid lubricant is a lubricant which can form a liquid film on a surface of a magnetic layer to decrease flowing of the liquid film. As described above, it is considered that the operation of fatty acid ester is different from the operation fatty acid and fatty acid amide as the lubricants. As a result of intensive studies of the inventors, by setting the C—H derived C concentration which is considered as an index for the presence amount of one or more components selected from the group consisting of fatty acid and fatty acid amide in the extreme outermost surface part of the magnetic layer to be 45 to 65 atom %, it is possible to prevent a significant decrease in resistance value of the TMR head occurring in a case of reproducing information recorded on the magnetic tape by the TMR head, in the magnetic tape device having the magnetic tape transportation speed equal to or lower than 18 m/sec.

As fatty acid ester, esters of various fatty acids described above regarding fatty acid can be used. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester of the magnetic layer forming composition is, for example, 0 to 10.0 parts by mass and is preferably 1.0 to 7.0 parts by mass with respect to 100.0 parts by mass of ferromagnetic powder.

In addition, the content of fatty acid ester in the non-magnetic layer forming composition is, for example, 0 to 10.0 parts by mass and is preferably 1.0 to 7.0 parts by mass with respect to 100.0 parts by mass of non-magnetic powder.

Center Line Average Surface Roughness Ra Measured Regarding Surface of Magnetic Layer Increasing a surface smoothness of the magnetic layer in the magnetic tape causes improvement of electromagnetic conversion characteristics. Regarding the surface smoothness of the magnetic layer, the center line average surface roughness Ra measured regarding the surface of the magnetic layer can be an index. In the invention and the specification, the center line average surface roughness Ra measured regarding the surface of the magnetic layer of the magnetic tape is a value measured with an atomic force microscope (AFM) in a region having an area of 40 µm×40 µm. As an example of the measurement conditions, the following measurement conditions can be used. The center line average surface roughness Ra shown in examples which will be described later is a value obtained by the measurement under the following measurement conditions.

The measurement is performed regarding the region of 40 µm×40 µm of the area of the surface of the magnetic layer of the magnetic tape with an AFM (Nanoscope 4 manufactured by Veeco Instruments, Inc.). A scan speed (probe movement speed) is set as 40 µm/sec and a resolution is set as 512 pixel×512 pixel.

In one aspect, the center line average surface roughness Ra measured regarding the surface of the magnetic layer of the magnetic tape is preferably equal to or smaller than 2.8 nm, more preferably equal to or smaller than 2.5 nm, even more preferably equal to or smaller than 2.3 nm, and still more preferably equal to or smaller than 2.0 nm, from a viewpoint of improving electromagnetic conversion characteristics. However, according to the studies of the inventors, it is found that, in a case where the center line average surface roughness Ra measured regarding the surface of the magnetic layer is equal to or smaller than 2.5 nm and any measures are not prepared, a decrease in resistance value of the TMR head tends to occur even more significantly. However, even a significant decrease in resistance value of the TMR head occurring in a case where the Ra is equal to or smaller than 2.5 nm can be prevented, in a case of the magnetic tape device according to one aspect of the invention. In addition, the center line average surface roughness Ra measured regarding the surface of the magnetic layer can be equal to or greater than 1.2 nm or equal to or greater than 1.3 nm. From a viewpoint of improving electromagnetic conversion characteristics, a low value of the Ra is preferable, and thus, the Ra may be lower than the values described above.

The surface smoothness of the magnetic layer, that is, the center line average surface roughness Ra measured regarding the surface of the magnetic layer can be controlled by a well-known method. For example, the surface smoothness of the magnetic layer can be controlled by adjusting a size of various powder (for example, ferromagnetic powder, non-magnetic filler which may be arbitrarily included, and the like) included in the magnetic layer or manufacturing conditions of the magnetic tape.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.0 to 6.0 µm

A thickness of the magnetic layer is preferably equal to or smaller than 0.15 µm and more preferably equal to or smaller than 0.1 µm, from a viewpoint of realization of high-density recording required in recent years. The thickness of the magnetic layer is even more preferably 0.01 to 0.1 µm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.1 to 1.5 µm and is preferably 0.1 to 1.0 µm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.8 µm, more preferably equal to or smaller than 1.5 µm, and even more preferably equal to or smaller than 1.1 µm, from a viewpoint of thinning the magnetic tape. According to the studies of the inventors, it is found that, in a case where the total thickness of the magnetic layer and the non-magnetic layer is equal to or smaller than 1.1 µm and any measures are not prepared, a decrease in resistance value of the TMR head tends to occur even more significantly. However, even a significant decrease in resistance value of the TMR head occurring in a case where the total thickness of the magnetic layer and the non-magnetic layer is equal to or smaller than 1.1 µm can be prevented, in a case of the magnetic tape device according to one aspect of the invention. In addition, the total thickness of the magnetic layer and the non-magnetic layer can be, for example, equal to or greater than 0.1 µm or equal to or greater than 0.2 µm.

A thickness of the back coating layer is preferably equal to or smaller than 0.9 µm and even more preferably 0.1 to 0.7 µm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scan electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP 1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used.

Coating Step, Cooling Step, and Heating and Drying Step

The magnetic layer can be formed by directly applying the magnetic layer forming composition onto the non-magnetic support or performing multilayer coating of the magnetic layer forming composition with the non-magnetic layer forming composition in order or at the same time. For details of the coating for forming each layer, a description disclosed in a paragraph 0066 of JP2010-231843A can be referred to.

As described above, in one aspect, the magnetic tape includes the non-magnetic layer between the non-magnetic support and the magnetic layer. Such a magnetic tape can be preferably manufactured by successive multilayer coating. A manufacturing step of performing the successive multilayer coating can be preferably performed as follows. The non-magnetic layer is formed through a coating step of applying a non-magnetic layer forming composition onto a non-magnetic support to form a coating layer, and a heating and drying step of drying the formed coating layer by a heating process. In addition, the magnetic layer is formed through a coating step of applying a magnetic layer forming composition onto the formed non-magnetic layer to form a coating layer, and a heating and drying step of drying the formed coating layer by a heating process.

In the non-magnetic layer forming step of the manufacturing step of performing such successive multilayer coating, it is preferable to perform a coating step by using the non-magnetic layer forming composition including one or more components selected from the group consisting of fatty acid and fatty acid amide and to perform a cooling step of cooling the coating layer between the coating step and the heating and drying step, in order to adjust the C—H derived C concentration to be 45 to 65 atom % in the magnetic tape including at least one or more components selected from the group consisting of fatty acid and fatty acid amide in the magnetic layer. The reason thereof is not clear, but the inventors has surmised that the reason thereof is because the components (fatty acid and/or fatty acid amide) are moved to the surface of the non-magnetic layer at the time of solvent volatilization of the heating and drying step, by cooling the coating layer of the non-magnetic layer forming composition before the heating and drying step. However, this is merely the surmise, and the invention is not limited thereto.

In the magnetic layer forming step, a coating step of applying a magnetic layer forming composition including ferromagnetic powder, a binding agent, and a solvent onto a non-magnetic layer to form a coating layer, and a heating and drying step of drying the formed coating layer by a heating process can be performed. The magnetic tape includes one or more components selected from the group consisting of fatty acid and fatty acid amide in the magnetic layer. In a case where the magnetic tape includes the non-magnetic layer between the non-magnetic support and the magnetic layer, the magnetic layer forming composition preferably includes one or more components selected from the group consisting of fatty acid and fatty acid amide, in order to manufacture such a magnetic tape. However, it is not necessary that the magnetic layer forming composition includes one or more components selected from the group consisting of fatty acid and fatty acid amide. This is because that a magnetic layer including one or more components selected from the group consisting of fatty acid and fatty acid amide can be formed, by applying the magnetic layer forming composition onto a non-magnetic layer to form the magnetic layer, after the components included in the non-magnetic layer forming composition are moved to the surface of the non-magnetic layer.

Hereinafter, a specific aspect of the manufacturing method of the magnetic tape will be described with reference to FIG. 1. However, the invention is not limited to the following specific aspect.

FIG. 1 is a step schematic view showing a specific aspect of a step of manufacturing the magnetic tape including a non-magnetic layer and a magnetic layer in this order on one surface of a non-magnetic support and including a back coating layer on the other surface thereof. In the aspect shown in FIG. 1, an operation of sending a non-magnetic support (elongated film) from a sending part and winding the non-magnetic support around a winding part is continuously performed, and various processes of coating, drying, and orientation are performed in each part or each zone shown in FIG. 1, and thus, it is possible to sequentially form a non-magnetic layer and a magnetic layer on one surface of the running non-magnetic support by multilayer coating and to form a back coating layer on the other surface thereof. The manufacturing step which is normally performed for manufacturing the coating type magnetic recording medium can be performed in the same manner except for including a cooling zone.

The non-magnetic layer forming composition is applied onto the non-magnetic support sent from the sending part in a first coating part (coating step of non-magnetic layer forming composition).

After the coating step, a coating layer of the non-magnetic layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably −10° C. to 0° C. and more preferably −5° C. to 0° C. The time for performing the cooling step (for example, time while an arbitrary part of the coating layer is delivered to and sent from the cooling zone (hereinafter, also referred to as a "staying time")) is not particularly limited, and in a case where the time described above is long, the C—H derived C concentration tends to be increased. Thus, the time described above is preferably adjusted by performing preliminary experiment if necessary, so that the C—H derived C concentration of 45 to 65 atom % is realized. In the cooling step, cooled air may blow to the surface of the coating layer.

After the cooling zone, in a first heating process zone, the coating layer is heated after the cooling step to dry the coating layer (heating and drying step). The heating and drying process can be performed by causing the non-magnetic support including the coating layer after the cooling step to pass through the heated atmosphere. An atmosphere temperature of the heated atmosphere here is, for example, approximately 60° to 140°. Here, the atmosphere temperature may be a temperature at which the solvent is volatilized and the coating layer is dried, and the atmosphere temperature is not limited to the atmosphere temperature in the range described above. In addition, the heated air may blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the non-magnetic layer formed by performing the heating and drying step in the first heating process zone (coating step of magnetic layer forming composition).

After that, while the coating layer of the magnetic layer forming composition is wet, an orientation process of the ferromagnetic powder in the coating layer is performed in an orientation zone. For the orientation process, a description disclosed in a paragraph 0067 of JP2010-231843A can be referred to.

The coating layer after the orientation process is subjected to the heating and drying step in the second heating process zone.

Next, in the third coating part, a back coating layer forming composition is applied to a surface of the non-magnetic support on a side opposite to the surface where the non-magnetic layer and the magnetic layer are formed, to form a coating layer (coating step of back coating layer forming composition). After that, the coating layer is heated and dried in the third heating process zone.

By the step described above, it is possible to obtain the magnetic tape including the non-magnetic layer and the magnetic layer in this order on one surface of the non-magnetic support and including the back coating layer on the other surface thereof.

In order to manufacture the magnetic tape, well-known various processes for manufacturing the coating type magnetic recording medium can be performed. For example, for various processes, descriptions disclosed in paragraphs 0067 to 0069 of JP2010-231843A can be referred to. In addition, a servo pattern can also be formed in the magnetic tape by a well-known method, in order to perform head tracking servo in the magnetic tape device.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce data (magnetic signals) to the magnetic tape, the magnetic tape is drawn from the magnetic tape cartridge and wound around the reel on the drive side. A magnetic head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the magnetic head comes into contact with and slides on the surface of the magnetic layer of the magnetic tape, and accordingly, the recording and/or reproduction of the magnetic signal is performed. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Reproducing Head

The magnetic tape device includes the TMR head as the reproducing head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a reproducing element for reproducing information recorded on the magnetic tape (specifically, information recorded on the magnetic layer of the magnetic tape). By converting the detected change in resistance value into a change in voltage, the information recorded on the magnetic tape can be reproduced.

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the information recorded on the magnetic tape can be reproduced. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in electric resistance causes a decrease in electromagnetic conversion characteristics. This decrease in resistance value of the TMR head can be prevented by using a magnetic tape having the C—H derived C concentration of 45 to 65 atom % as the magnetic tape in which information to be reproduced is recorded.

The reproducing head is a magnetic head including at least the TMR element as a reproducing element for reproducing information recorded on the magnetic tape. Such a magnetic head may include or may not include an element for recording information in the magnetic tape. That is, the reproducing head and the recording head may be one magnetic head or separated magnetic heads. In addition, the magnetic head including the TMR element as a reproducing element may include a servo pattern reading element for performing head tracking servo.

Magnetic Tape Transportation Speed

The magnetic tape transportation speed of the magnetic tape device is equal to or lower than 18 m/sec. The magnetic tape transportation speed is also referred to as a running speed, and is a relative speed between the magnetic tape and the reproducing head in a case where the magnetic tape is transported (runs) in the magnetic tape device in order to reproduce information recorded on the magnetic tape. Normally, the magnetic tape transportation speed is set in a control unit of the magnetic tape device. It is desired that the magnetic tape transportation speed is decreased to be equal to or lower than 18 m/sec, in order to prevent a deterioration of recording and reproducing characteristics. But, in a case where the magnetic tape transportation speed is equal to or lower than 18 m/sec in the magnetic tape device including the TMR head as a reproducing head, a decrease in resistance value of the TMR head occurs particularly significantly. In the magnetic tape device according to one aspect of the invention, such a decrease in resistance value can be prevented by using a magnetic tape having the C—H derived C concentration of 45 to 65 atom %. The magnetic tape transportation speed is equal to or lower than 18 m/sec or may be equal to or lower than 15 m/sec or equal to or lower than 10 m/sec. The magnetic tape transportation speed can be, for example, equal to or higher than 1 m/sec.

Magnetic Reproducing Method

One aspect of the invention relates to a magnetic reproducing method including: reproducing information recorded on a magnetic tape by a reproducing head, in which a magnetic tape transportation speed during the reproducing is equal to or lower than 18 m/sec, the reproducing head is a magnetic head including a tunnel magnetoresistance effect type element as a reproducing element, the magnetic tape includes a non-magnetic support, and a magnetic layer including ferromagnetic powder and a binding agent on the non-magnetic support, the magnetic layer includes one or more components selected from the group consisting of fatty acid and fatty acid amide, and a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %. The reproducing of the information recorded on the magnetic tape is performed by bringing the magnetic tape into contact with the reproducing head allowing sliding while transporting (causing running of) the magnetic tape. The details of the reproducing of the magnetic reproducing method and the details of the magnetic tape and the reproducing head used in the magnetic reproducing method are as the descriptions regarding the magnetic tape device according to one aspect of the invention.

According to one aspect of the invention, a magnetic tape used in a magnetic tape device in which a TMR head is used as a reproducing head and a magnetic tape transportation speed in a case of reproducing information recorded on the magnetic tape is equal to or lower than 18 m/sec, the magnetic tape including: a magnetic layer including ferromagnetic powder and a binding agent on a non-magnetic support, in which the magnetic layer includes one or more components selected from the group consisting of fatty acid and fatty acid amide, and a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom % is also provided. The details of the magnetic tape is also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted.

Example 1

1. Manufacturing of Magnetic Tape
(1) Preparation of Alumina Dispersion
3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 20 $m^2/g$, and dispersed in the presence of zirconia beads by a paint shaker for 5 hours. After the dispersion, the dispersion liquid and the beads were separated by a mesh and an alumina dispersion was obtained.

(2) Magnetic Layer Forming Composition List
Magnetic Solution
Ferromagnetic powder: 100.0 parts
    Ferromagnetic hexagonal barium ferrite powder having an average particle size (average plate diameter) of 21 nm
$SO_3Na$ group-containing polyurethane resin: 14.0 parts
    Weight-average molecular weight: 70,000, $SO_3Na$ group: 0.2 meq/g
Cyclohexanone: 150.0 parts
Methyl ethyl ketone: 150.0 parts
Abrasive liquid
Alumina dispersion prepared in the section 1: 6.0 parts
Silica Sol (Projection Forming Agent Liquid)
Colloidal silica (average particle size: see Table 5): 2.0 parts
Methyl ethyl ketone: 1.4 parts
Other Components
Stearic acid: 2.0 parts
Stearic acid amide: 0.2 parts
Butyl stearate: 2.0 parts
Polyisocyanate (CORONATE (registered trademark) manufactured by Nippon Polyurethane Industry Co., Ltd.): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
    Average particle size (average long axis length): 0.15 μm
    Average acicular ratio: 7
    BET specific surface area: 52 $m^2/g$
Carbon black: 20.0 parts
    Average particle size: 20 nm
$SO_3Na$ group-containing polyurethane resin: 18.0 parts
    Weight-average molecular weight: 70,000, $SO_3Na$ group: 0.2 meq/g
Stearic acid: 2.0 parts
Stearic acid amide: 0.2 parts
Butyl stearate: 2.0 parts
Cyclohexanone: 300.0 parts
Methyl ethyl ketone: 300.0 parts
(4) Back Coating Layer Forming Composition List
Non-magnetic inorganic powder: α-iron oxide: 80.0 parts
    Average particle size (average long axis length): 0.15 μm Average acicular ratio: 7
BET specific surface area: 52 m²/g
Carbon black: 20.0 parts
Average particle size: 20 nm
A vinyl chloride copolymer: 13.0 parts
Sulfonic acid group-containing polyurethane resin: 6.0 parts
Phenylphosphonic acid: 3.0 parts
Methyl ethyl ketone: 155.0 parts
Polyisocyanate: 5.0 parts
Cyclohexanone: 355.0 parts (5) Preparation of Each Layer Forming Composition The magnetic layer forming composition was prepared by the following method. The magnetic liquid was prepared by dispersing (beads-dispersing) each component with a batch type vertical sand mill for 24 hours. As the dispersion beads, zirconia beads having a bead diameter of 0.5 mm were used. The prepared magnetic liquid and the abrasive liquid were mixed with other components (silica sol, other components, and finishing additive solvent) and beads-dispersed for 5 minutes by using the sand mill, and a process (ultrasonic dispersion) was performed with a batch type ultrasonic device (20 kHz, 300 W) for 0.5 minutes. After that, the filtering was performed by using a filter having an average hole diameter of 0.5 and the magnetic layer forming composition was prepared.

The non-magnetic layer forming composition was prepared by the following method. Each component excluding a lubricant (stearic acid, stearic acid amide, and butyl stearate), cyclohexanone, and methyl ethyl ketone was dispersed by using batch type vertical sand mill for 24 hours to obtain a dispersion liquid. As the dispersion beads, zirconia beads having a bead diameter of 0.5 mm were used. After that, the remaining components were added into the obtained dispersion liquid and stirred with a dissolver. The dispersion liquid obtained as described above was filtered with a filter having an average hole diameter of 0.5 µm and a non-magnetic layer forming composition was prepared.

The back coating layer forming composition was prepared by the following method. Each component excluding polyisocyanate and cyclohexanone was kneaded and diluted by an open kneader, and subjected to a dispersion process of 12 passes, with a transverse beads mill dispersing device and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having an average hole diameter of 1 µm and a back coating layer forming composition was prepared.

(6) Manufacturing Method of Magnetic Tape

A magnetic tape was manufactured by the specific aspect shown in FIG. 1. The magnetic tape was specifically manufactured as follows.

A support made of polyethylene naphthalate having a thickness of 5.0 µm was sent from the sending part, and the non-magnetic layer forming composition prepared in the section (5) was applied to one surface thereof so that the thickness after the drying becomes a thickness shown in Table 5 in the first coating part, to form a coating layer. The cooling step was performed by passing the formed coating layer through the cooling zone in which the atmosphere temperature is adjusted to 0° C. for the staying time shown in Table 5 while the coating layer is wet, and then the heating and drying step was performed by passing the coating layer through the first heating process zone at the atmosphere temperature of 100° C., to form a non-magnetic layer.

Then, the magnetic layer forming composition prepared in the section (5) was applied onto the non-magnetic layer so that the thickness after the drying becomes a thickness shown in Table 5 in the second coating part, and a coating layer was formed. A homeotropic alignment process was performed in the orientation zone by applying a magnetic field having a magnetic field strength of 0.3 T to the surface of the coating layer of the magnetic layer forming composition in a vertical direction while the coating layer is wet (not dried), and the coating layer was dried in the second heating process zone (atmosphere temperature of 100° C.).

After that, in the third coating part, the back coating layer forming composition prepared in the section (5) was applied to the surface of the non-magnetic support made of polyethylene naphthalate on a side opposite to the surface where the non-magnetic layer and the magnetic layer are formed, so that the thickness after the drying becomes 0.5 µm, to form a coating layer, and the formed coating layer was dried in a third heating process zone (atmosphere temperature of 100° C.).

After that, a calendar process (surface smoothing treatment) was performed with a calendar roll configured of only a metal roll, at a speed of 80 m/min, linear pressure of 294 kN/m (300 kg/cm), and a calendar temperature (surface temperature of a calendar roll) shown in Table 5.

Then, a heating process was performed in the environment of the atmosphere temperature of 70° C. for 36 hours. After the heating process, the layer was slit to have a width of ½ inches (0.0127 meters), and a servo pattern was formed on the magnetic layer by a commercially available servo writer.

By doing so, a magnetic tape was obtained.

The thickness of each layer of the manufactured magnetic tape is acquired by the following method. It was confirmed that the thicknesses of the formed non-magnetic layer and the magnetic layer were the thicknesses shown in Table 5 and the thicknesses of the back coating layer and the non-magnetic support were the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation described below, and the other part was used in order to measure a resistance value of the TMR head which will be described later.

2. Evaluation of Physical Properties of Magnetic Tape (1) Center Line Average Surface Roughness Ra Measured Regarding Surface of Magnetic Layer The measurement regarding a measurement area of 40 µm×40 µm in the surface of the magnetic layer of the magnetic tape was performed with an atomic force microscope (AFM, Nanoscope 4 manufactured by Veeco Instruments, Inc.), and a center line average surface roughness Ra was acquired. A scan speed (probe movement speed) was set as 40 µm/sec and a resolution was set as 512 pixel×512 pixel.

(2) C—H Derived C Concentration

The X-ray photoelectron spectroscopic analysis was performed regarding the surface of the magnetic layer of the magnetic tape (measurement region: 300 µm×700 µm) by the following method using an ESCA device, and a C—H derived C concentration was calculated from the analysis result.

Analysis and Calculation Method

All of the measurement (i) to (iii) described below were performed under the measurement conditions shown in Table 1.

TABLE 1

| Device | AXIS-ULTRA manufactured by Shimadzu Corporation |
|---|---|
| Excitation X-ray source | Monochromatic Al—Kα ray (output: 15 kV, 20 mA) |
| Analyzer mode | Spectrum |
| Lens mode | Hybrid (analysis area: 300 μm × 700 μm) |
| Neutralization electron gun for charge correction (Charge neutraliser) | ON (used) |
| Light electron extraction angle (take-off angle) | 10 deg. (angle formed by a detector and a sample surface) |

(i) Wide Scan Measurement

A wide scan measurement (measurement conditions: see Table 2) was performed regarding the surface of the magnetic layer of the magnetic tape with the ESCA device, and the types of the detected elements were researched (qualitative analysis).

TABLE 2

| Scan range | Pass Energy | Energy resolution (Step) | Capturing Time (Dwell) | Number of integration times (Sweeps) |
|---|---|---|---|---|
| 0 to 1200 eV | 160 eV | 1 eV/step | 100 ms/step | 5 |

(ii) Narrow Scan Measurement

All elements detected in (i) described above were subjected to narrow scan measurement (measurement conditions: see Table 3). An atom concentration (unit: atom %) of each element detected was calculated from a peak surface area of each element by using software for a data process attached to the device (Vision 2.2.6). Here, the C concentration was also calculated.

(iii) Acquiring of C1s Spectra

The C1s spectra were acquired under the measurement conditions disclosed in Table 4. Regarding the acquired C1s spectra, after correcting a shift (physical shift) due to a sample charge by using software for a data process attached to the device (Vision 2.2.6), a fitting process (peak resolution) of the C1s spectra was performed by using the software described above. In the peak resolution, the fitting of C1s spectra was performed by a nonlinear least-squares method using a Gauss-Lorentz complex function (Gaussian component: 70%, Lorentz component: 30%), and a percentage (peak area ratio) of the C—H peak occupying the C1s spectra was calculated. A C—H derived C concentration was calculated by multiplying the calculated C—H peak area ratio by the C concentration acquired in (ii) described above.

TABLE 4

| Spectra | Scan range | Pass Energy | Energy resolution (Step) | Capturing Time (Dwell) | Number of integration times (Sweeps) |
|---|---|---|---|---|---|
| C1s | 276 to 296 eV | 10 eV | 0.1 eV/step | 200 ms/step | 20 |

An arithmetical mean of values obtained by performing the above-mentioned process at different positions of the surface of the magnetic layer of the magnetic tape three times is set as the C—H derived C concentration.

3. Measurement of Resistance Value of Reproducing Head

The magnetic tape manufactured in the part 1. was attached to a reel tester having a width of ½ inches (0.0127 meters) fixed to a recording head and a reproducing head, and information was recorded and reproduced. As the recording head, a metal-in-gap (MIG) head (gap length of 0.15 μm, track width of 1.0 μm) was used, and the reproducing head, a TMR head (element width of 70 nm) commercially available as a reproducing head for HDD was used. A tape length of the magnetic tape was 1,000 m, and a total of 4,000 passes of the transportation (running) of the magnetic tape was performed by setting the magnetic tape transportation speed (relative speed of the magnetic tape and

TABLE 3

| Spectra[Note1] | Scan range | Pass energy | Energy resolution (Step) | Capturing Time (Dwell) | Number of integration times (Sweeps)[Note2] |
|---|---|---|---|---|---|
| C1s | 276 to 296 eV | 80 eV | 0.1 eV/step | 100 ms/step | 3 |
| C12p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note1] Spectra shown in FIG. 3 (element type) are examples, and in a case where an element not shown in Table 3 is detected by the qualitative analysis of the section (1), the same narrow scan measurement is performed in a scan range including entirety of spectra of the elements detected.

[Note2] The spectra having excellent signal-to-noise ratio (S/N ratio) were measured in a case where the number of integration times is set as three times. However, even in a case where the number of integration times regarding the entirety of spectra is set as five times, the quantitative results are not affected.

the magnetic head) at the time of performing reproducing as a value shown in Table 5. The reproducing head was moved in a width direction of the magnetic tape by 2.5 μm for 1 pass, a resistance value (electric resistance) of the reproducing head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a reproducing head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 5.

Examples 2 to 8 and Comparative Examples 1 to 15

1. Manufacturing of Magnetic Tape

A magnetic tape was manufactured in the same manner as in Example 1, except that various conditions shown in Table 5 were changed as shown in Table 5. In Table 5, in the comparative examples in which "not performed" is disclosed in a column of the cooling zone staying time, a magnetic tape was obtained by a manufacturing step not including the cooling zone.

2. Evaluation of Physical Properties of Magnetic Tape

Various physical properties of the manufactured magnetic tape were evaluated in the same manner as in Example 1.

3. Measurement of Resistance Value of Reproducing Head

A resistance value of the reproducing head was measured by the same method as that in Example 1, by using the manufactured magnetic tape. The magnetic tape transportation speed at the time of the reproducing was set as a value shown in Table 5. In Examples 2 to 8 and Comparative Examples 7 to 15, the TMR head which was the same as that in Example 1 was used as a reproducing head. In Comparative Examples 1 to 6, a commercially available spin valve type GMR head (element width of 70 nm) was used as a reproducing head. This GMR head was a magnetic head having a CIP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results of the evaluations described above are shown in Table 5.

TABLE 5

|  | Example 1 | Example 2 | Example 3 | Example 4 | Example 5 | Example 6 | Example 7 | Example 8 |
|---|---|---|---|---|---|---|---|---|
| Magnetic layer thickness | 0.1 μm | 0.1 μm | 0.1 μm | 0.1 μm | 0.1 μm | 0.1 μm | 0.1 μm | 0.1 μm |
| Non-magnetic layer thickness | 1.5 μm | 1.0 μm | 1.0 μm | 0.5 μm | 0.5 μm | 0.3 μm | 0.3 μm | 0.3 μm |
| Total thickness of magnetic layer + non-magnetic layer | 1.6 μm | 1.1 μm | 1.1 μm | 0.6 μm | 0.6 μm | 0.4 μm | 0.4 μm | 0.4 μm |
| Colloidal silica average particle size | 120 nm | 80 nm | 80 nm | 80 nm | 80 nm | 40 nm | 40 nm | 40 nm |
| Calender temperature | 80 °C. | 90 °C. | 90 °C. | 90 °C. | 90 °C. | 110 °C. | 110 °C. | 110 °C. |
| Center line average surface roughness Ra | 2.8 nm | 2.0 nm | 2.0 nm | 2.0 nm | 2.0 nm | 1.5 nm | 1.5 nm | 1.5 nm |
| Cooling zone staying time | 1 second | 1 second | 5 seconds | 5 seconds | 50 seconds | 50 seconds | 50 seconds | 50 seconds |
| C—H derived C concentration | 45 atom % | 45 atom % | 55 atom % | 55 atom % | 65 atom % | 65 atom % | 65 atom % | 65 atom % |
| Reproducing head | TMR | TMR | TMR | TMR | TMR | TMR | TMR | TMR |
| Magnetic tape transportation speed | 18 m/sec | 18 m/sec | 18 m/sec | 18 m/sec | 18 m/sec | 18 m/sec | 10 m/sec | 1 m/sec |
| Number of times of occurrence of decrease in resistance value (times) | 0 | 0 | 0 | 0 | 0 | 0 | 0 | 0 |

TABLE 5-continued

| | | | | | | | | |
|---|---|---|---|---|---|---|---|---|
| Rate of decrease in resistance value (%) | 5 | 7 | 5 | 13 | 3 | 5 | 10 | 12 |

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Magnetic layer thickness | 0.1 μm | 0.1 μm | 0.1 μm | 0.1 μm | 0.1 μm | 0.1 μm | 0.1 μm | 0.1 μm |
| Non-magnetic layer thickness | 1.5 μm | 1.0 μm | 1.0 μm | 0.5 μm | 0.5 μm | 0.5 μm | 1.5 μm | 1.5 μm |
| Total thickness of magnetic layer + non-magnetic layer | 1.6 μm | 1.1 μm | 1.1 μm | 0.6 μm | 0.6 μm | 0.6 μm | 1.6 μm | 1.6 μm |
| Colloidal silica average particle size | 120 nm | 120 nm | 80 nm | 80 nm | 80 nm | 80 nm | 120 nm | 120 nm |
| Calender temperature | 80° C. | 90° C. | 90° C. | 80° C. | 90° C. | 90° C. | 80° C. | 80° C. |
| Centerline average surface roughness Ra | 2.8 nm | 2.5 nm | 2.0 nm | 2.5 nm | 2.0 nm | 2.0 nm | 2.8 nm | 2.8 nm |
| Cooling zone staying time | Not performed | Not performed | Not performed | Not performed | Not performed | Not performed | Not performed | Not performed |
| C—H derived C concentration | 35 atom % | 35 atom % | 35 atom % | 35 atom % | 35 atom % | 35 atom % | 35 atom % | 35 atom % |
| Reproducing head | GMR | GMR | GMR | GMR | GMR | GMR | TMR | TMR |
| Magnetic tape transportation speed | 18 m/sec | 18 m/sec | 18 m/sec | 18 m/sec | 18 m/sec | 1 m/sec | 19 m/sec | 18 m/sec |
| Number of times of occurrence of decrease in resistance value (times) | 0 | 0 | 0 | 0 | 0 | 0 | 0 | 1 |
| Rate of decrease in resistance value (%) | 0 | 0 | 0 | 0 | 0 | 0 | 10 | — |

| | | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|
| | Magnetic layer thickness | 0.1 μm | 0.1 μm | 0.1 μm | 0.1 μm | 0.1 μm | 0.1 μm | 0.1 μm |
| | Non-magnetic layer thickness | 1.0 μm | 1.0 μm | 0.5 μm | 0.5 μm | 0.3 μm | 1.0 μm | 1.0 μm |
| | Total thickness of magnetic layer + non-magnetic layer | 1.1 μm | 1.1 μm | 0.6 μm | 0.6 μm | 0.4 μm | 1.1 μm | 1.1 μm |
| | Colloidal silica average particle size | 120 nm | 80 nm | 80 nm | 80 nm | 40 nm | 80 nm | 120 nm |
| | Calender temperature | 90° C. | 90° C. | 80° C. | 90° C. | 110° C. | 90° C. | 90° C. |
| | Centerline average surface roughness Ra | 2.5 nm | 2.0 nm | 2.5 nm | 2.0 nm | 1.5 nm | 2.0 nm | 2.5 nm |
| | Cooling zone staying time | Not performed | Not performed | Not performed | Not performed | Not performed | 180 seconds | Not performed |
| | C—H derived C concentration | 35 atom % | 35 atom % | 35 atom % | 35 atom % | 35 atom % | 70 atom % | 35 atom % |
| | Reproducing head | TMR | TMR | TMR | TMR | TMR | TMR | TMR |
| | Magnetic tape transportation speed | 18 m/sec | 18 m/sec | 18 m/sec | 18 m/sec | 18 m/sec | 18 m/sec | 1 m/sec |

TABLE 5-continued

| | | | | | | | |
|---|---|---|---|---|---|---|---|
| Number of times of occurrence of decrease in resistance value (times) | 3 | 7 | 9 | 10 | 10 | 1 | 6 |
| Rate of decrease in resistance value (%) | — | — | — | — | — | — | — |

As shown in Table 5, in Comparative Examples 1 to 6 in which the GMR head was used as a reproducing head, the magnetic tape transportation speed was equal to or lower than 18 m/sec and, even in a case where the C—H derived C concentration of the magnetic tape was not 45 to 65 atom %, a significant decrease in resistance value of the reproducing head was not observed. In addition, in Comparative Example 7 in which the magnetic tape transportation speed exceeded 18 m/sec although the TMR head was used as a reproducing head, even in a case where the C—H derived C concentration of the magnetic tape was not 45 to 65 atom %, a significant decrease in resistance value of the reproducing head was not observed. On the other hand, in Comparative Examples 8 to 15 in which the TMR head was used as a reproducing head, the magnetic tape transportation speed was equal to or lower than 18 m/sec, and the C—H derived C concentration of the magnetic tape was 45 to 65 atom %, a significant decrease in resistance value of the reproducing head occurred.

With respect to this, in Examples 1 to 8 in which the TMR head was used as a reproducing head, the magnetic tape transportation speed was equal to or lower than 18 m/sec, and the C—H derived C concentration of the magnetic tape was 45 to 65 atom %, it was possible to prevent a significant decrease in resistance value of the reproducing head.

One aspect of the invention is effective for usage of magnetic recording for which high-sensitivity reproducing of information recorded with high density is desired.

What is claimed is:

1. A magnetic tape device comprising:
   a magnetic tape; and
   a reproducing head,
   wherein a magnetic tape transportation speed of the magnetic tape device is equal to or lower than 18 m/sec,
   the reproducing head is a magnetic head including a tunnel magnetoresistance effect type element as a reproducing element,
   the magnetic tape includes a non-magnetic support, and a magnetic layer including ferromagnetic powder and a binding agent on the non-magnetic support,
   the magnetic layer includes one or more components selected from the group consisting of fatty acid and fatty acid amide, and
   a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %.

2. The magnetic tape device according to claim 1, wherein the C—H derived C concentration is 50 to 65 atom %.

3. The magnetic tape device according to claim 1, wherein a center line average surface roughness Ra measured regarding a surface of the magnetic layer is equal to or smaller than 2.8 nm.

4. The magnetic tape device according to claim 3, wherein the center line average surface roughness Ra is equal to or smaller than 2.5 nm.

5. The magnetic tape device according to claim 1, wherein the magnetic tape includes a non-magnetic layer including non-magnetic powder and a binding agent between the non-magnetic support and the magnetic layer, and
   a total thickness of the magnetic layer and the non-magnetic layer is equal to or smaller than 1.8 µm.

6. The magnetic tape device according to claim 5, wherein the total thickness of the magnetic layer and the non-magnetic layer is equal to or smaller than 1.1 µm.

7. The magnetic tape device according to claim 1, wherein the magnetic tape transportation speed is equal to or higher than 10 m/sec but equal to or lower than 18 m/sec.

8. A magnetic reproducing method comprising:
   reproducing information recorded on a magnetic tape by a reproducing head,
   wherein a magnetic tape transportation speed during the reproducing is equal to or lower than 18 m/sec,
   the reproducing head is a magnetic head including a tunnel magnetoresistance effect type element as a reproducing element,
   the magnetic tape includes a non-magnetic support, and a magnetic layer including ferromagnetic powder and a binding agent on the non-magnetic support,
   the magnetic layer includes one or more components selected from the group consisting of fatty acid and fatty acid amide, and
   a C—H derived C concentration calculated from a C—H peak area ratio of C1s spectra obtained by X-ray photoelectron spectroscopic analysis performed on the surface of the magnetic layer at a photoelectron take-off angle of 10 degrees is 45 to 65 atom %.

9. The magnetic reproducing method according to claim 8, wherein the C—H derived C concentration is 50 to 65 atom %.

10. The magnetic reproducing method according to claim 8, wherein a center line average surface roughness Ra measured regarding a surface of the magnetic layer is equal to or smaller than 2.8 nm.

11. The magnetic reproducing method according to claim 10, wherein the center line average surface roughness Ra is equal to or smaller than 2.5 nm.

12. The magnetic reproducing method according to claim 8, wherein the magnetic tape includes a non-magnetic layer including non-magnetic powder and a binding agent between the non-magnetic support and the magnetic layer, and a total thickness of the magnetic layer and the non-magnetic layer is equal to or smaller than 1.8 μm.

13. The magnetic reproducing method according to claim 12,
wherein the total thickness of the magnetic layer and the non-magnetic layer is equal to or smaller than 1.1 μm.

14. The magnetic reproducing method according to claim 8,
wherein the magnetic tape transportation speed is equal to or higher than 10 m/sec but equal to or lower than 18 m/sec.

* * * * *